United States Patent [19]

Enomoto

[11] Patent Number: 5,552,484
[45] Date of Patent: Sep. 3, 1996

[54] VINYL CHLORIDE RESIN COMPOSITION

[75] Inventor: Masaki Enomoto, Kanagawa, Japan

[73] Assignee: Vinyl Industry Co., Ltd., Tokyo, Japan

[21] Appl. No.: 260,024

[22] Filed: Jun. 15, 1994

Related U.S. Application Data

[63] Continuation-in-part of Ser. No. 32,334, Mar. 16, 1993, abandoned, which is a continuation-in-part of Ser. No. 940,479, Sep. 4, 1992, abandoned.

[30] Foreign Application Priority Data

Oct. 30, 1991 [JP] Japan .................................. 3-310014

[51] Int. Cl.$^6$ ............................................... C08L 53/02
[52] U.S. Cl. ............................. 525/98; 525/96; 525/193
[58] Field of Search ............................ 525/96, 98, 193

[56] References Cited

U.S. PATENT DOCUMENTS

| 3,620,995 | 11/1971 | King | 524/300 |
|---|---|---|---|
| 3,801,529 | 4/1974 | Potter | 524/144 |
| 4,060,508 | 11/1977 | Sugahara | 523/440 |
| 4,161,472 | 7/1979 | Lehr | 525/4 |

OTHER PUBLICATIONS

The Stabilization of PVC, F. Chevassus and R. DeBroutelles, E. Arnold Ltd, 1963, London, pp. 101, 108–113.

*Primary Examiner*—Irina Zemel
*Attorney, Agent, or Firm*—Kane, Dalsimer, Sullivan, Kurucz, Levy, Eisele and Richard, LLP

[57] ABSTRACT

A vinyl chloride resin composition comprising 50 to 99.9 parts by weight of a vinyl chloride resin and 0.1 to 50 parts by weight of an aromatic vinyl compound block copolymer which is particularly a block copolymer of a styrenic monomer and a diene monomer and 0.01 to 15 parts by weight of a fatty acid or salts thereof having 6 to 34 carbon atoms. The composition has excellent processability and mechanical strength. Particularly, flowability in a lower temperature range and impact strength are improved.

14 Claims, 2 Drawing Sheets

VINYL CHLORIDE RESIN COMPOSITION

This is a continuation-in-part of application Ser. No. 08/032,334 filed on Mar. 16, 1993, now abandoned, which is a continuation-in-part of U.S. Ser. No. 07/940,479 filed Sep. 4, 1992, now abandoned.

FIELD OF THE INVENTION

The present invention relates to a vinyl chloride resin composition which has excellent processability and mechanical properties, more specifically, which has good flowability in a lower temperature range, improved impact strength, and good productivity into a molding compound.

BACKGROUND OF THE INVENTION

Vinyl chloride resins are less expensive and suitable to general purposes and, therefore, is being produced and consumed in a huge amount. However, vinyl chloride resins have drawbacks that they have low impact resistance and are difficult to process.

It is known to add a methyl methacrylate-butadiene styrene copolymer (or MBS) as an impact modifier in order to improve the impact resistance of vinyl chloride resins (Japanese Patent Application Laid-Open Nos. Sho-57 98542/1982, Sho-58-152039/1983 and Hei-2-191652/1990). However, flowability of such a vinyl chloride resin composition decreases with the increasing amount of MBS added, so that a load in kneading increases.

In order to improve the processability of vinyl chloride resins, it was tried to add a lower molecular weight vinyl chloride resin, to modify vinyl chloride resins with ethylene or analogues, or to adjust the amount of a plasticizer or lubricant added. However, the addition of the lower molecular weight resin or a plasticizer causes significant decreases in softening point, impact strength and tensile properties of the vinyl chloride resin composition and sometimes may result in setting of a molded product in a process and bad surface appearance. In the ethylene modification, a high content of ethylene or a low degree of polymerization is required to improve processability at lower temperatures, which however results in deterioration of mechanical properties, particularly, softening point and impact strength. Meanwhile, to raise impact strength, a high degree of polymerization or addition of an impact modifier such as MBS is required and, then, processability will worsen. Use of a large amount of a lubricant causes bleed-out or plate-out during molding and bad surface appearance, and sometimes may result in deterioration of mechanical properties due to insufficient kneading.

It was also tried to diversely change production conditions for polyvinyl chloride molding compounds so as to improve processability of the compounds. A method which relies on control of kneading conditions in an extruder requires skilled labor in general. Such control is difficult in vinyl chloride resins which are difficult to knead. Further, in conventional rigid polyvinyl chloride molding compounds, process properties depend largely upon changed production conditions such as temperatures and types and dimensions of a screw. Accordingly, molding conditions must be changed for each compound obtained and, sometimes, molding is even impossible.

As mentioned above, it was difficult to maintain or improve impact properties of vinyl chloride resins while minimizing deterioration of other physical properties and, at the same time, to improve processability.

SUMMARY OF THE INVENTION

A purpose of the invention is to solve the aforesaid disadvantages and provide a vinyl chloride resin composition which has excellent physical properties such as excellent flowability in a lower temperature range, impact properties, excellent moldability such as sufficient moldability even at lower temperatures, and good productivity and may be prepared less expensively. Particularly, the invention provides a polyvinyl chloride molding compound which has these properties and, in addition, shows no change in quality with changed production conditions.

The present inventor has found that the above purpose is attained by incorporating a combination of an aromatic vinyl compound block copolymer or a hydrogenated product thereof with a particular aliphatic carboxylic acid, naphthenic acid, and salt thereof in a vinyl chloride resin.

That is, the present invention is a vinyl chloride resin composition, characterized in that it comprises (A) 50 to 99.9 parts by weight of a vinyl chloride;

(B) 0.1 to 50 parts by weight of an aromatic vinyl compound block copolymer or a hydrogenated product thereof;

(C) 0.01 to 15 parts by weight of at least one acid and at least one salt thereof selected from the group consisting of substituted or unsubstituted, saturated or unsaturated fatty acids having 6 to 34 carbon atoms, naphthenic acid, and normal salts thereof, wherein the total amount of (A) and (B) is 100 parts by weight.

PREFERRED EMBODIMENTS OF THE INVENTION

Figure 1:
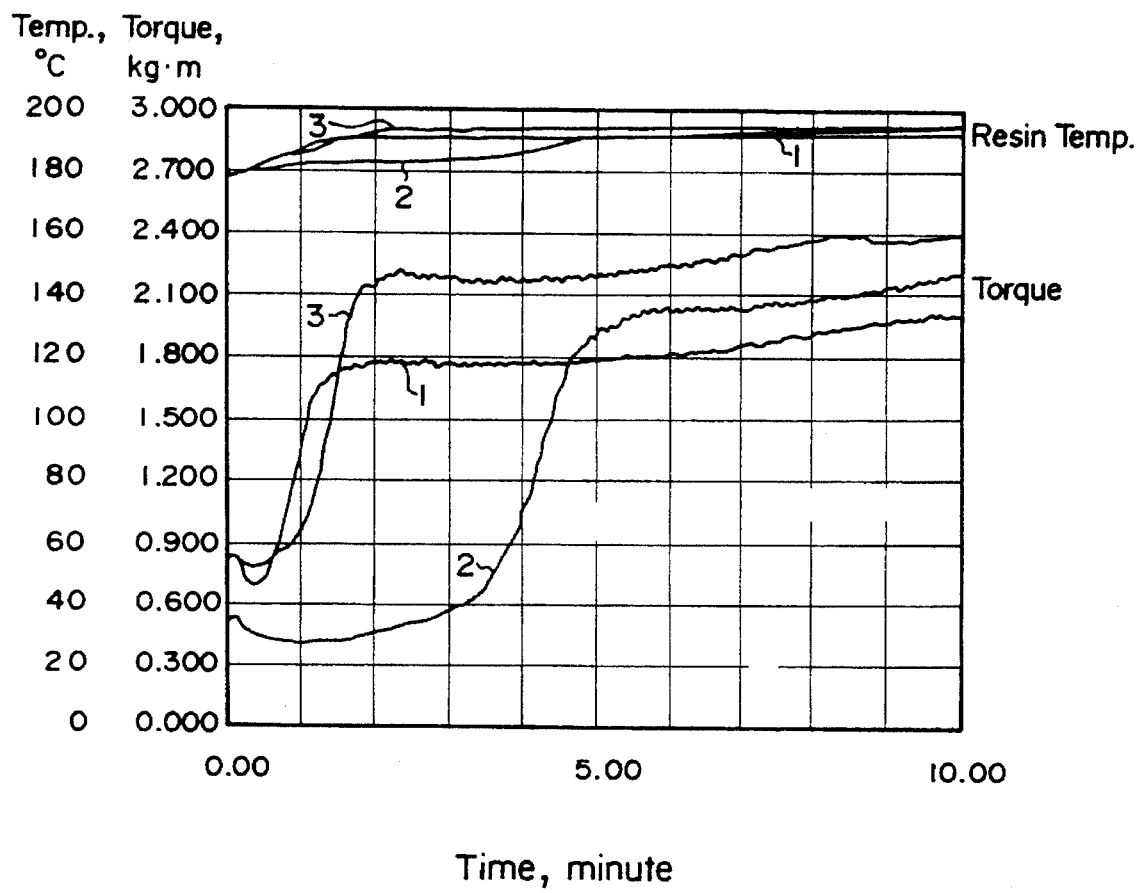
FIG. 1 is a graph showing temperatures and kneading torques with time for the compositions obtained in Example 5.

Any known vinyl chloride resins may be used, such as homopolymer of vinyl chloride, copolymers of vinyl chloride with copolymerizable monomers such as ethylene, acrylic acid, methacrylic acid and alkyl (meth)acrylate, and copolymers with unsaturated monomers having a functional group such as an ester or epoxy group. Vinyl chloride resins having an average polymerization degree of about 400 to 10,000, particularly about 600 to 2,000, is preferred from a point of view of physical properties and processability of the composition.

Any known aromatic vinyl compound block copolymers or hydrogenated products thereof may be used as component (B). Preferred are block copolymers of styrenic monomers with diene monomers or hydrogenated products thereof. These are copolymers in a form of multi blocks, triblocks, diblocks or radial blocks in which polystyrene and polydiene are of block forms, or hydrogenated products thereof, such as styrene-butadiene block copolymers (SBS), styreneisoprene block copolymers (SEPS), and hydrogenated products of these, i.e., styrene-ethylene-butene block copolymers (SEBS) and styrene-ethylene-propylene block copolymers (SEPS). It is preferred that the content of the aromatic vinyl compounds in the aromatic vinyl compound block copolymer (B) or hydrogenated product thereof is 10 to 50% by weight. If the content is less than 10% by weight, the flowability of the vinyl chloride resin composition may be lower. If the content exceeds 50% by weight, mechanical properties such as impact strength may lower. The molecular weight of the aromatic vinyl compound block copolymer or hydrogenated product thereof is preferably about 20,000 to 300,000, more preferably about 50,000 to 250,000. If the molecular weight is less than 20,000, impact strength and processability are improved insufficiently. Meanwhile, if it exceeds 300,000, flowability may decrease undesirably.

The above component (B), aromatic vinyl compound block copolymer or hydrogenated product thereof, is used preferably in an amount of 0.1 to 50 parts by weight with the total of (A) and (B) being 100 parts by weight. If the amount of (B) is less than 0.1 part by weight, neither impact strength nor processability is improved. Meanwhile, if it exceeds 50 parts by weight, mechanical properties and flame resistance, which the vinyl chloride resin intrinsically has, deteriorate. More preferably, 60 to 99.5 parts by weight of the vinyl chloride resin are blended with 40 to 0.5 part by weight of the aromatic vinyl compound block copolymer or hydrogenated product thereof. Particularly, 70 to 99 parts by weight of the vinyl chloride resin, are blended with 30 parts to 1 part by weight of the aromatic vinyl compound block copolymer or hydrogenated product thereof.

The fatty acid used in the invention may be substituted, for instance, with a hydroxyl group or unsubstituted, and may be saturated or unsaturated. It has 6 to 34 carbon atoms, preferably 6 to 18 carbon atoms. Naphthenic acid is known per se. Normal salts of such acids may also be used, such as salts of the acids with lead, zinc, cadmium, magnesium, aluminum, calcium, barium or strontium. Di or polycarboxylic acids may also be used. The salts should be normal salts. That is, basic salts do not attain the effects of the invention, particularly the good flowability. Preferred are stearic acid represented by the formula: $CH_3(CH_2)_{16}COOH$; sebacic acid, $HOOC(CH_2)_8COOH$; oleic acid, $CH_3(CH_2)_7CH=CH(CH_2)_7COOH$; undecylenic acid, $CH_2=CH(CH_2)_8COOH$; ricinoleic acid, $CH_3(CH_2)_5CH(OH)CH_2CH=CH(CH_2)_7COOH$; lauric acid, $CH_3(CH_2)_{10}COOH$; octylic acid, $CH_3(CH_2)_6COOH$; and at least one normal salt thereof.

A plasticizer may be incorporated. However, the composition of the invention exhibits excellent flowability even without a plasticizer. This is surprising. Therefore, it is enough for the composition of the invention to contain no more than 8 parts by weight of a plasticizer.

The resin composition of the invention may further contain optional components such as, for instance, stabilizers and stabilizing auxiliaries. Any stabilizers and stabilizing auxiliaries which are generally used in vinyl chloride resins may be used in the invention. Examples of the stabilizers include lead stabilizers such as tribasic lead sulfate, dibasic lead stearate, dibasic lead phosphite, dibasic lead sulfite, tribasic lead maleate and dibasic lead phthalate; tin stabilizers such as organic tin compounds represented by the general formula $R_x-SnY_{4-x}$, alkyl group such as a methyl, butyl or octyl group, Y represents a functional group such as a mercapto, maleate or carboxylate group, and n is 1 or 2. Examples of the stabilizing auxiliaries include phosphite type such as alkyl aryl phosphite, polyhydric alcohol type such as pentaerythritol and dipentaerythritol, β-diketo compounds, and epoxy compounds. Among these, epoxy compounds serve also as a plasticizer. These stabilizers or stabilizing auxiliaries may be used alone or in combination of two or more of these. The amount of the stabilizer or auxiliary added depends upon envisaged properties of the composition, and may be preferably 0.01 to 10 parts by weight, more preferably 0.1 to 3 parts by weight, per 100 arts by weight of the total of components (A) and (B) in general.

Processing auxiliaries, fillers, rubbers, pigments and/or compatibilizers may be added in the composition of the invention. The compatibilizers are used for stable dispersion of component (B), and are preferably graft or block copolymers of polystyrene or polyethylene, which are compatible with the aromatic vinyl compound block copolymer, with polymethyl methacrylate or the like.

The composition of the invention may be prepared in any manner with any apparatus as far as the components of the composition are substantially uniformly dispersed, mixed or kneaded. For instance, the components are dry blended in a Henschel mixer, ribbon blender or tumbler mixer. Then, the blend may be molded directly, or melt-kneaded with an extruder or mixing rolls, pelletized and then molded. Any molding methods may be used, such as extrusion, injection, blowing, calendaring and vacuum forming, which may be chosen suitably for desired products.

The present invention will be further explained in reference to the following unlimitative Examples.

EXAMPLE 1

To 90 parts by weight of a vinyl chloride resin (TK5 1000, Shin-etsu Chemical Industry, polymerization degree 1050) as component (A) were blended 10 parts by weight of a styrene-butadiene block copolymer (TUFPRENE 125, Asahi Chemical Industry, styrene content 40 wt. %, hereinafter referred to as SBS) as component (B). Further, 1.0 part by weight of tribasic lead sulfate (TS-102, Shinagawa Kako) and 0.5 part by weight of dibasic lead stearate (DBL, Toa Rika) both as a stabilizer, and, 1.0 part by weight of lead stearate (NS-2, Shinagawa Kako) and 0.5 part by weight of stearic acid (LUNAC S-40, Kao) both as Component (C) were added and dispersed uniformly by mixing to prepare a blend. The blend was kneaded at a kneading temperature of 170° C. for 5 minutes with 8-inch rolls and taken out portionwise, which was cooled at room temperature and used to prepare test pieces.

Flow values were determined at 170° C., 180° C. and 190° C. with a Koka type flow tester (Shimazu Seisakusho) in accordance with JIS (Japanese Industrial Standards) K7311.

A Charpy impact value was determined according to JIS K7111-1977. The results are as shown in Table 1.

COMPARISON EXAMPLE 1

The procedure of Example 1 was repeated with the exception that neither SBS nor component C (i.e., lead stearate and stearic acid) was added.

COMPARISON EXAMPLE 2

The procedure of Example 1 was repeated with the exception that SBS was not added.

COMPARISON EXAMPLE 3

The procedure of Example 1 was repeated with the exception that component C was not added.

The results are as shown in Table 1 and Table 1A.

In comparison between Comparison Examples 1 and 2, the use of Component C increased the flow value by 7 at 170° C. In comparison between Comparison Examples 1 and 3, the use of SBS increased the flow value by 10. It is expected that the use of both Component C and SBS would increase a flow value by 17 (7 plus 10). Surprisingly, as seen in Example 1, the increase of 59 (60 minus 1) in a flow value was attained. Similarly, the estimated increase at 180° C. is 41; the actual increase, 87. The estimated increase at 190° C. is 50; the actual increase, 114.

Thus, a synergistic effect was obtained by a combination of SBS with Component C.

TABLE 1

|  | E.1 | C.1 | C.2 | C.3 |
| --- | --- | --- | --- | --- |
| Composition |  |  |  |  |
| PVC | 90 | 100 | 100 | 90 |
| SBS | 10 | — | — | 10 |
| Component C | 1.5 | — | 1.5 | — |
| Stabilizer | 1.5 | 1.5 | 1.5 | 1.5 |
| Flow value, $10^{-3}$ ml/sec |  |  |  |  |
| 170° C. | 60 | 1 | 8 | 11 |
| 180° C. | 89 | 2 | 27 | 18 |
| 190° C. | 117 | 3 | 38 | 18 |
| Charpy |  |  |  |  |
| impact value kg · cm/cm$^2$ | 36 | 10 | 10 | 123 |

COMPARISON EXAMPLE 4

The procedure of Example 1 was repeated with the exception that 0.5 part by weight of stearic acid was added as Component C, without adding 1.0 parts of lead stearate used in Example 1.

The flow value was 24 at 170° C.; 44, 180° C.; and 60, 190° C. The Charpy impact value was as high as 134 kg.cm/cm$^2$, which is higher than the values in Comparison Examples 1 to 3.

COMPARISON EXAMPLE 5

The procedure of Example 1 was repeated with the exception that 1.0 part by weight of lead stearate was added as Component C, without adding 0.5 parts of stearic acid used in Example 1.

The flow value was 35 at 170° C.; 60, 180° C.; and 80, 190° C. The Charpy impact value was 40. Data for Example 1 and Comparison Examples 3, 4 and 5 are set forth in Table 1A.

TABLE 1A

|  | Ex 1 | C.4 | C.5 | Estimated | C.3 |
| --- | --- | --- | --- | --- | --- |
| PVC | 90 | 90 | 90 |  | 90 |
| SBS | 10 | 10 | 10 |  | 10 |
| Stabilizer | 1.50 | 1.50 | 1.50 |  | 1.50 |
| Component C | 1.50 |  |  |  | — |
| (Pb-St) | 1.00 | — | 1.00 |  | — |
| (St-Ac) | 0.50 | 0.50 | — |  | — |
| Flow Value at |  |  |  |  |  |
| 160° C. | 45 | 13 | 20 | 28 | 5 |
| 170° C. | 60 | 24 | 35 | 48 | 11 |
| 180° C. | 89 | 44 | 60 | 88 | 18 |
| 190° C. | 117 | 60 | 80 | 122 | 18 |
| Charpy Impact Value | 36 | 134 | 40 |  | 123 |

The vinyl chloride resin compositions of the present invention exhibit an improved flowability at lower temperatures compared to that known in the prior art, which is an entirely unexpected and unpredicted result. For instance, compare Example 1 to Comparison Example 4. In Example 1 stearic acid and its normal salt, lead stearate are added to the vinyl chloride resin composition. At a temperature of 170° C. flowability was 60. Conversely, in Comparison Example 4, the procedure of Example 1 was repeated except that lead stearate was omitted, and the flow value obtained was 24 at 170° C. Likewise, in Comparison Example 5 the procedure of Example 1 was repeated with the exception that the stearic acid of Example 1 was omitted. The flow value obtained was 35 at 170° C.

In Comparison Example 3, the acid and normal salt thereof (component C) were omitted. The flow value obtained in example 3 at 170° C. was 11. In Comparison Example 4 (no lead stearate) a flow value of 24 was obtained, an improvement of 13 over Comparison Example 3. Likewise, in Comparison Example 5 (no stearic acid) a flow value of 35 was obtained, an improvement of 24 over the value of 11 obtained in Comparison Example 3. Therefore, it can be estimated that the addition of both stearic acid and lead stearate should result in a flowability improvement of 37 (that is, the improved value of 13 as found in Comparison Example 4 plus the improved value of 24 found in Comparison Example 5). Thus, the estimated flow value should be about 48. (That is, the improved value of 37 resulting from the additives plus the value of 11 obtained in without additive in Comparison Example 3). However, an unexpected result is obtained because upon addition of the acid and the normal salt thereof, that is stearic acid and lead stearate, the flow value was found to be 60 (see Example 1). This shows that the addition of both the acid and the normal salt thereof effects an unpredicted and unexpected improvement in the value of flowability over that known in the art. Similar calculations may also be made for the other flowability values at other temperature values as shown in Table 1, and Table 1A and as set forth in the Examples.

Figure 2:
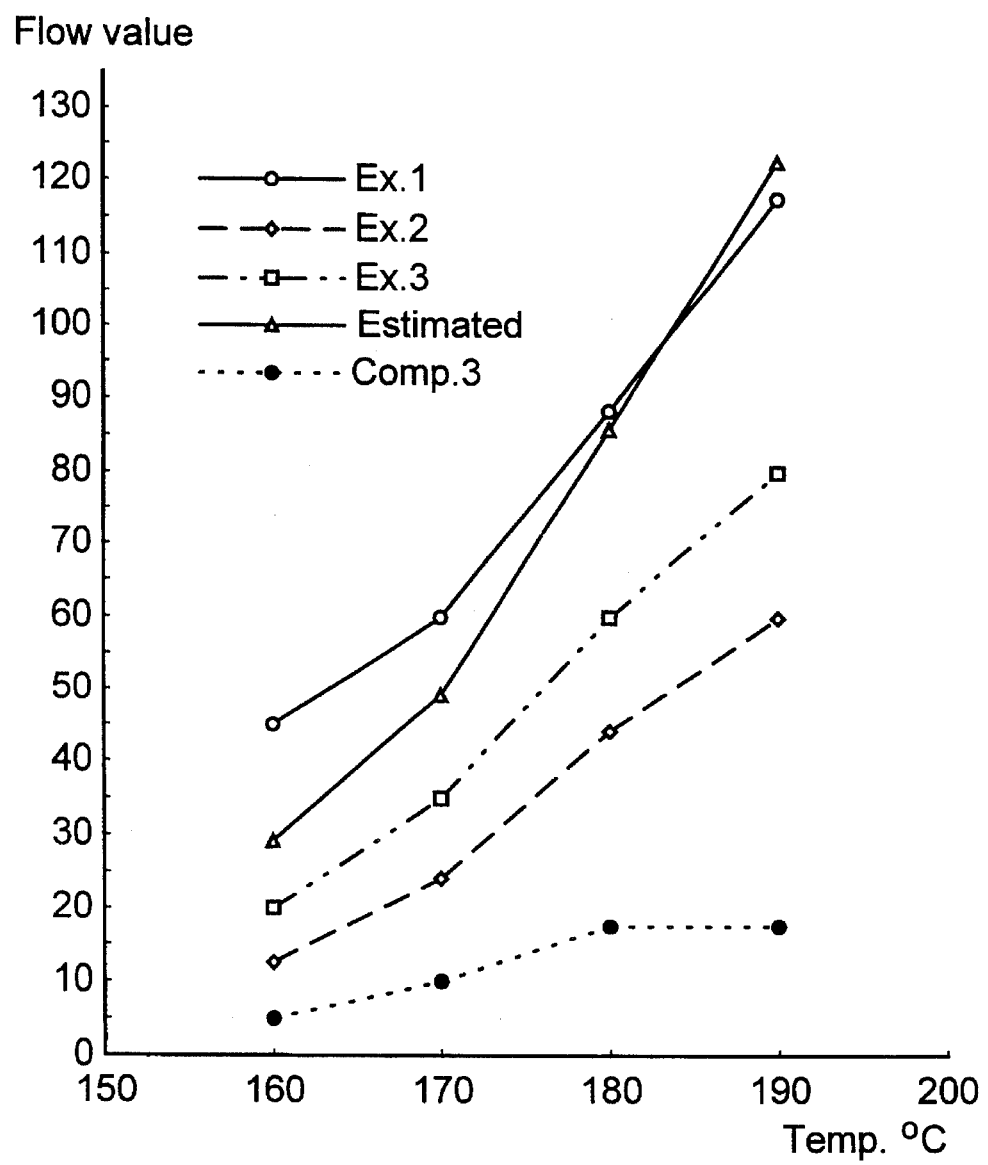
FIG. 2 is a plot of realized and estimated flow values for certain illustrative examples and comparison examples at various temperatures.

Further, FIG. 2 is a graph showing the correlation between flow value and temperature for Examples 1, 2, 3, Comparison Examples 2 and 3, and estimated values for Examples 2 and 3. By adding both the acid and normal salt thereof, flowability values at 160° C. exceed that which would be predicted in the manner described above.

EXAMPLE 2

The procedures of Example 1 were repeated except that the amounts of the vinyl chloride resin and SBS were 95 and 5 parts by weight, respectively. The flow values at 170° C., 180° C. and 190° C. and the Charpy impact value of the test pieces are as shown in Table 2, where the results of Example 1 are indicated together.

COMPARISON EXAMPLE 6

The procedures of Example 1 were repeated except that a vinyl chloride resin with a polymerization degree of 700 (S-1007, Kanegafuchi Chemical Industry) was used in an amount of 100 parts by weight and no SBS was used. The flow values at 170° C., 180° C. and 190° C. and the Charpy impact value of the test pieces are as shown in Table 2. It is seen that the flow values in this Comparison Example are small compared to those of Examples 1 and 2 despite the smaller polymerization degree of the vinyl chloride resin used in the Comparison Example. The impact strength is also lower.

COMPARISON EXAMPLE 7

The procedures of Example 1 were repeated except that an ethylene-modified vinyl chloride resin (Ryuron E 50, Tosoh, hereinafter referred to as EMPVC), which has better flowability, was used in place of the vinyl chloride resin and SBS. The flow values at 170° C., 180° C. and 190° C. and the Charpy impact value of the test pieces are as shown in Table 2. It is seen that the flowability in Example 2 is relatively comparable to that in this Comparison Example 7 where EMPVC, which has better flowability, was used. The impact strength in Example 4 is outstandingly higher than that in Comparison Example 5.

COMPARISON EXAMPLES 8 AND 9

The procedures of Example 1 were repeated except that 90 or 95 parts by weight of the vinyl chloride resin of a polymerization degree of 700 used in Comparison Example 8 were used, and 10 or 5 parts by weight of a methyl methacrylate-butadiene-styrene copolymer (KANE-ACE B-56, Kanegafuchi Chemical Industry, referred to as MBS) were used in place of the SBS. The flow values at 170° C., 180° C. and 190° C. and the Charpy impact values of the test pieces are as shown in Table 2. It is seen that the flow values of the test pieces of these Comparison Examples are remarkably low compared to those of Examples 1 and 2.

TABLE 2

| | E.1 | E.2 | C.6 | C.7 | C.8 | C.9 |
|---|---|---|---|---|---|---|
| Composition | | | | | | |
| PVC[1] | 90 | 95 | — | — | — | — |
| PVC[2] | — | — | 100 | — | 90 | 95 |
| SBS | 10 | 5 | — | — | — | — |
| EMPVC[3] | — | — | — | 100 | — | — |
| MBS | — | — | — | — | 10 | 5 |
| Component C | 1.5 | 1.5 | 1.5 | 1.5 | 1.5 | 1.5 |
| Stabilizer | 1.5 | 1.5 | 1.5 | 1.5 | 1.5 | 1.5 |
| Flow Value, $10^{-3}$ ml/sec | | | | | | |
| 170° C. | 60 | 16 | 2 | 33 | 6 | 4 |
| 180° C. | 89 | 44 | 32 | 48 | 11 | 21 |
| 190° C. | 117 | 73 | 45 | 65 | 16 | 30 |
| Charpy impact value, kg · cm/cm² | 36 | 20 | 14 | 7 | 97 | 20 |

[1]PVC of a polymerization degree of 1050
[2]PVC of a polymerization degree of 700
[3]Ryuron E-650

EXAMPLES 3 AND 4

The procedures of Example 1 were repeated except that 90 or 95 parts by weight of the vinyl chloride resin used in Example 1 were used, 10 or 5 parts by weight of the SBS used in Example 1 were used, and 25 parts by weight of heavy calcium carbonate (Softon 1200, Bihoku Funka Industry) were further used as an inorganic filler. The flow values at 170° C., 180° C. and 190° C. and the Charpy impact values of the test pieces are as shown in Table 3.

COMPARISON EXAMPLE 10

The procedures of Examples 3 and 4 were repeated except that the vinyl chloride resin was used in an amount of 100 parts by weight and no SBS was used. The flow values at 170° C., 180° C. and 190° C. and the Charpy impact value are as shown in Table 3. It is seen that the flow values and the impact strength of this Comparison Example are lower than those of Examples 3 and 4.

COMPARISON EXAMPLES 11 AND 12

The procedures of Example 3 were repeated except that an ethylene-modified vinyl chloride resin or EMPVC (Ryuron E-430, Tosoh) was used in such an amount as indicated in Table 3 and no SBS was used. The flow values at 170° C., 180° C. and 190° C. and the Charpy impact values of the test pieces are as shown in Table 3. The flow values of the test pieces obtained in Comparison Example 11 are almost similar with those of Comparison Example 10 and considerably lower than those of Example 3. The impact strength in Comparison Example 11 is remarkably lower than that of Example 3. The test pieces of Comparison Example 12 where the EMPVC was used in an amount of 50 parts by weight show flowability comparable to that of Example 4, but has considerably low impact strength compared to that of Example 4.

TABLE 3

| | E.3 | E.4. | C.10 | C.11 | C.12 |
|---|---|---|---|---|---|
| Composition | | | | | |
| PVC | 90 | 95 | 100 | 90 | 50 |
| SBS | 10 | 5 | — | — | — |
| EMPVC[4] | — | — | — | 10 | 50 |
| Component C | 1.5 | 1.5 | 1.5 | 1.5 | 1.5 |
| Stabilizer | 1.5 | 1.5 | 1.5 | 1.5 | 1.5 |
| Inorganic filler | 25 | 25 | 25 | 25 | 25 |
| Flow value, $10^{-3}$ ml/sec | | | | | |
| 170° C. | 30 | 8 | 2 | 3 | 11 |
| 180° C. | 43 | 22 | 9 | 10 | 19 |
| 190° C. | 62 | 38 | 17 | 20 | 34 |
| Charpy impact value, kg · cm/cm² | 16 | 12 | 7 | 6.5 | 5 |

[4]Ryuron E-430

EXAMPLE 5

To 90 parts by weight of a vinyl chloride resin (TK1000, Shin-etsu Chemical Industry, polymerization degree of 1050) were added 10 parts by weight of a styrene-butadiene block copolymer (TUFPRENE 125, Asahi Chemical Industry), 15 parts by weight of heavy calcium carbonate (Softon 1200, Bihoku Funka Industry) and, 1.0 part by weight of TS-102 (Shinagawa Kako) plus 0.5 part by weight of DBL (Toa Rika) both as a stabilizer, and, 1.0 part by weight of NS-2 (Shinagawa Kako) and 0.5 part by weight of LUNAC S-40, Kao) both as Component (C), which were dispersed uniformly by mixing to prepare a blend. The blend was kneaded for 10 minutes with a labo blast mill (Toyoseiki Seisakusho) at a mixer temperature of 180° C. and rotor revolutions of 60 rpm while measuring the resin temperature and the torque of a kneading load with time. For comparison, the above procedures were repeated with a composition in which no SBS was added and a composition in which the SBS was replaced with 10 parts by weight of a methyl methacrylate-butadiene-styrene copolymer (or MBS) (KANE-ACE B-56, Kanegafuchi Chemical Industry). The results are as shown in FIG. 1, in which the torque waves are averaged outputs. Curve 1 is for the composition of the invention; curve 2, the composition with no SBS; and curve 3, for the composition with MBS. It is seen that the melted composition of the invention containing SBS (curve 1) shows a smaller torque of a kneading load and turns into gel more quickly than the composition containing MBS (curve 3).

EXAMPLES 6 TO 8

The procedure of Example 1 was repeated with the exception that 1.0 part by weight of lead stearate was replaced with 1.0 part by weight of calcium stearate (CaSt), barium stearate (Ba-St) or zinc stearate (Zn-St) in Examples 6, 7 and 8, respectively.

The results are as shown in Table 4 together with the results of Example 1.

TABLE 4

|  | E.1 | E.6 | E.7 | E.8 |
|---|---|---|---|---|
| Composition |  |  |  |  |
| PVC | 90 | 90 | 90 | 90 |
| SBS | 90 | 10 | 10 | 10 |
| Component C |  |  |  |  |
| Pb-St | 1.0 |  |  |  |
| CA-St |  | 1.0 |  |  |
| Ba-St |  |  | 1.0 |  |
| Zn-St |  |  |  | 1.0 |
| stearic acid | 0.5 | 0.5 | 0.5 | 0.5 |
| Stabilizer | 1.5 | 1.5 | 1.5 | 1.5 |
| Flow value, $10^{-3}$ ml/sec |  |  |  |  |
| 170° C. | 60 | 25 | 25 | 48 |
| 180° C. | 89 | 41 | 41 | 80 |
| 190° C. | 117 | 62 | 60 | 105 |
| Charpy impact value, kg · cm/cm$^2$ | 36 | 56 | 73 | 35 |

EXAMPLES 9 TO 11

Example 1 was repeated, but the amount of Component C was varied as set forth in Table 5.

TABLE 5

|  | Ex 9 | Comp 13 | Comp 14 | Ex 10 | Comp 15 | Comp 16 | Ex 11 | Comp 17 | Comp 18 | Comp 3 |
|---|---|---|---|---|---|---|---|---|---|---|
| Component C | 0.50 |  |  | 0.10 |  |  | 0.01 |  |  | — |
| (Pb-St) | 0.30 | — | 0.3 | 0.07 | — | 0.07 | 0.007 | — | 0.007 | — |
| (St-Ac) | 0.20 | 0.2 | — | 0.03 | 0.03 | — | 0.003 | 0.003 | — | — |
| Flow Value |  |  |  |  |  |  |  |  |  |  |
| at 160° C. | 25 | 10 | 13 | 15 | 7 | 8 | 13 | 6 | 7 | 5 |
| 170° C. | 42 | 15 | 17 | 18 | 13 | 15 | 19 | 12 | 11 | 11 |
| 180° C. | 55 | 30 | 35 | 36 | 20 | 23 | 27 | 19 | 20 | 18 |
| 190° C. | 74 | 40 | 45 | 36 | 22 | 28 | 27 | 20 | 21 | 18 |
| Charpy Impact Value | 90 | 110 | 100 | 120 | 120 | 120 | 120 | 120 | 120 | 123 |

In comparison example 13 where no lead stearate was used, the flow value at 160° C. is 10. Thus, the improvement in flow value over comparison example 3 where the flow value is 5 is 5. In comparison example 14, where no stearic acid is used, the flow value is 13, which means the improvement in flow value is 8. Accordingly, when both lead stearate and stearic acid are used, the estimated flow value is 5 (comp ex3)+5 (improvement in comp ex 13)+8 (improvement in comp ex 14)=18. However, the actual flow value in Example 9 is 25, so a greater than expected improvement is attained. When the same calculation is done for these examples at 170° C., the estimated value is 21, while the actual value attained is 42.

In Example 10, the amount of component C is present in 0.1 part. The estimated value at 160° C. is 10, while the attained value is 15. The estimated value at 170° C. is 17, while the actual value is 18.

In Example 11 the amount of component C is 0.01 part, the estimated value at 160° C. is 8, while the attained value is 13. At 170° C., the estimated value is 12, while the attained value is 19. It can be seen than the greater than additive effect of using the specified fatty acids and normal salts thereof is present over the entire specified range of 0.01 part to 1.5 parts by weight.

We claim:

1. A vinyl chloride resin composition, characterized in that it comprises
   (A) 50 to 99.9 parts by weight of a vinyl chloride resin,
   (B) 0.1 to 50 parts by weight of an aromatic vinyl compound block copolymer or a hydrogenated product thereof, and
   (C) 0.01 to 1.5 parts by weight of at least one acid selected from the group consisting of saturated or unsaturated fatty acids having 6 to 18 carbon atoms and naphthenic acid, said acids being substituted or unsubstituted with a hydroxyl group, and at least one normal salt of said at least one acid, said normal salt containing a metal selected from the group consisting of lead, zinc, and cadmium, wherein the total amount of (A) and (B) is 100 parts by weight.

2. The vinyl chloride resin composition as claimed in claim 1, wherein component (C) is selected from stearic acid, sebacic acid, oleic acid, undecylenic acid and ricinoleic acid, lauric acid, octylic acid and the normal salts thereof.

3. The vinyl chloride resin composition as claimed in claim 1, wherein the amount of component (C) is 0.1 to 5 parts by weight.

4. The vinyl chloride resin composition as claimed in claim 1, wherein the composition further comprises 8 parts by weight or less of a plasticizer.

5. The vinyl chloride resin composition as claimed in claim 1 wherein the aromatic vinyl compound block copolymer is a block copolymer composed of a styrenic monomer and a diene monomer.

6. The vinyl chloride resin composition as claimed in claim 1, wherein the content of the aromatic vinyl compound in the copolymer (B) is 10 to 50% by weight.

7. The vinyl chloride resin composition as claimed in claim 1, wherein the copolymer (B) is selected from the group consisting of styrene-butadiene block copolymers, styrene-isoprene block copolymers, styrene-ethylene-butene block copolymers and styrene-ethylene-propylene block copolymers.

8. The vinyl chloride resin composition as claimed in claim 1, wherein a molecular weight of the copolymer (B) is 20,000 to 300,000.

9. The vinyl chloride resin composition as claimed in claim 1, wherein a molecular weight of the copolymer (B) is 50,000 to 250,000.

10. The vinyl chloride resin composition as claimed in claim 1, wherein an average polymerization degree of the vinyl chloride resin (A) is 400 to 10,000.

11. The vinyl chloride resin composition as claimed in claim 1, wherein an average polymerization degree of the vinyl chloride resin (A) is 600 to 2,000.

12. The vinyl chloride resin composition as claimed in claim 1, wherein the amount of the vinyl chloride resin is 60 to 99.5 parts by weight and the amount of the copolymer (B) is 0.5 to 40 parts by weight.

13. The vinyl chloride resin composition as claimed in claim 1, wherein the amount of the vinyl chloride resin (A) is 70 to 99 parts by weight and the amount of the copolymer (B) is 1 to 30 parts by weight.

14. The vinyl chloride resin composition as set forth in claim 1 wherein the at least one acid is stearic acid and the normal salt of the at least one acid is selected from the group consisting of lead stearate, zinc stearate, and cadmium stearate.

* * * * *

UNITED STATES PATENT AND TRADEMARK OFFICE
CERTIFICATE OF CORRECTION

PATENT NO. : 5,552,484
DATED : September 3, 1996
INVENTOR(S) : Masaki Enomoto

It is certified that error appears in the above-indentified patent and that said Letters Patent is hereby corrected as shown below:

On the title page, Item [73], list the Assignee to read as follows:

--RIKEN VINYL INDUSTRY CO., LTD.--

Signed and Sealed this

Seventh Day of January, 1997

Attest:

BRUCE LEHMAN

Attesting Officer     Commissioner of Patents and Trademarks